J. R. CRAIGHEAD.
POWER FACTOR INDICATOR.
APPLICATION FILED OCT. 7, 1911.

1,064,131.

Patented June 10, 1913.

Witnesses:
Earl G. Klock.
J. Ellis Glen

Inventor:
James R. Craighead,
by Albert G. Davis
His Attorney.

UNITED STATES PATENT OFFICE.

JAMES R. CRAIGHEAD, OF SCHENECTADY, NEW YORK, ASSIGNOR TO GENERAL ELECTRIC COMPANY, A CORPORATION OF NEW YORK.

POWER-FACTOR INDICATOR.

1,064,131.	Specification of Letters Patent.	Patented June 10, 1913.

Application filed October 7, 1911.  Serial No. 653,389.

*To all whom it may concern:*

Be it known that I, JAMES R. CRAIGHEAD, a citizen of the United States, residing at Schenectady, county of Schenectady, State of New York, have invented certain new and useful Improvements in Power-Factor Indicators, of which the following is a specification.

My invention relates to devices for indicating the power factor of alternating current circuits, and its object is to provide a simple and efficient power factor indicator which is not affected by ordinary changes in frequency occurring in commercial circuits. I obtain the desired result by providing two relatively movable elements, each including two or more mechanically displaced windings, employed phase splitting means in circuit with the windings of each element, so as to produce in each element a rotating field, and giving to the phase splitting means for each element such characteristics that the circuits of that element have the same time constants as those of the other element. With such an arrangement a change in frequency which changes the phase of the currents in the windings of either element produces a precisely similar change in the windings of the other element, so that the indication of the instrument is not affected by the ordinary variations of frequency in commercial circuits.

My invention will best be understood by reference to the accompanying drawings, in which—

Figure 1:
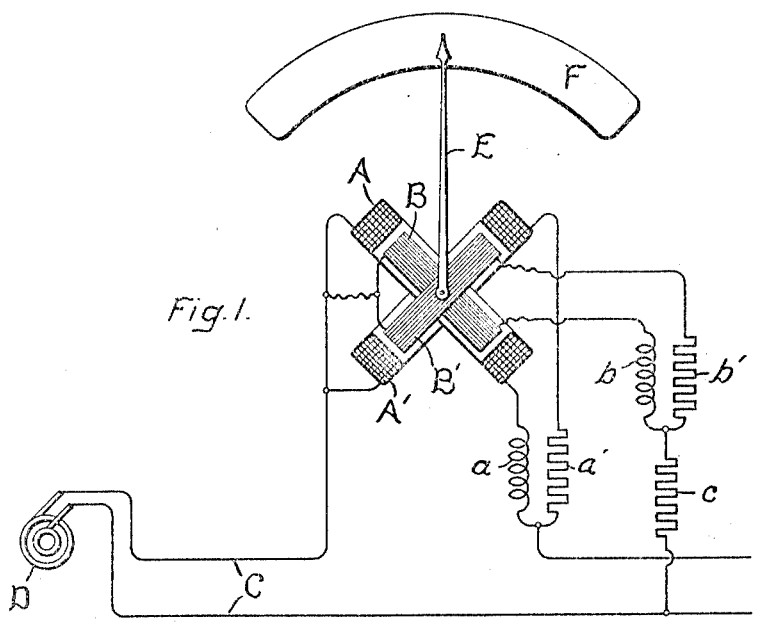
Figure 2:
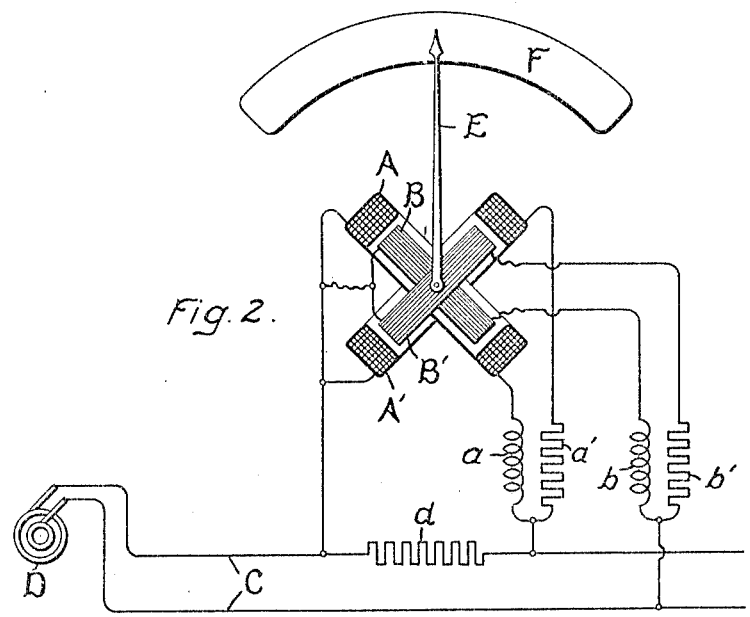

Figure 1 shows diagrammatically a power factor indicator arranged in accordance with my invention, and Fig. 2 shows a modification in the circuit connections.

In Fig. 1 A and A′ represent two coils or windings which constitute the stationary element of the instrument. If only two windings are employed, they are preferably displaced from each other by 90 degrees as shown. The moving element comprises two similar coils B and B′. The coils A and A′ are connected in parallel, with impedances $a$ and $a'$ included in the parallel circuits in series with the two coils, respectively. These two impedances are of different time constants, so as to produce a phase displacement between the currents in the two coils A and A′. The impedance $a$ is represented as a reactance and $a'$ as a non-inductive resistance. The coils A and A′, with their impedances, are connected in series with the circuit C, the power factor of which is to be measured. The alternating generator for the circuit is indicated diagrammatically at D. The coils A and A′ thus constitute the current coils of the instrument. The movable coils B and B′ are the potential coils. These also are connected in parallel, with impedances $b$ and $b'$ of different time constants included in the parallel circuits. The coils B B′, with their impedances, are connected in shunt to the circuit C through a non-inductive resistance $c$ of sufficient amount to make the current flowing through it, and consequently the resultant current of the coils B and B′, substantially in phase with the voltage in circuit C. The moving element of the instrument carries a suitable pointer E, moving over a suitable scale F. When the current in the circuit C is in phase with the voltage, the resultant of the current in coils A and A′ will be in phase with the resultant of the current in coils B and B′. Furthermore, if the time constant of the circuit of impedance $b$ is the same as that of $a$ and the time constant of the circuit of impedance $b'$ is the same as that of impedance $a'$, and if the ratio of impedance between $a$ and $b$ is the same as that between $a'$ and $b'$, the current in coil B will be in phase with the current in coil A and the current in coil B′ will be in phase with the current in coil A′; and also the ratios of the currents in coils A and B and in coils A′ and B′ will be the same. Under these conditions the movable element will occupy the position shown, with each of the movable coils parallel with the corresponding stationary coil. The best condition for minimum error in the readings of the instrument due to commercial changes of frequency is, obviously, obtained when the resistance of circuit B′ equals the impedance of circuit B and the resistance of circuit A′ equals the impedance of circuit A at the rated frequency of the instrument. If the current in circuit C is not in phase with the voltage of the circuit, the currents in the stationary and movable elements will not be in phase, but will be displaced by an amount corresponding to the displacement of the current in circuit C from the voltage. The movable element of the instrument will consequently stand at an angle from that shown in the drawings, the amount of the angle corresponding to the phase displacement of the current in circuit C. It will be seen that a variation of frequency will not affect the indications of the instrument, because whatever change is produced in the currents in the coils of one element there will be a corresponding change in the currents in the coils of the other element because the circuits of the two elements have the same time constants and proportional impedances, so that an increase in frequency, for instance, which would produce a greater lag of the current in coil A with respect to the current in circuit C will produce a precisely similar increase of lag in coil B with respect to the voltage of circuit C, so that the relative phases of current in coils A and B will not be altered.

In Fig. 2 a modification of the circuit connections is shown. In this figure the coils A and A', with their impedances, instead of being inserted directly in the circuit C, are shunted across a non-inductive resistance $d$ in series with the circuit. With this arrangement the voltage impressed on the circuit of coils A and A' is in phase with the current, and it consequently becomes unnecessary to employ in the circuit of coils B and B' the non-inductive resistance shown at $c$ in Fig. 1, since if the time constants of the circuits of the stationary and movable elements are the same then the currents in the coils of the two elements will be in phase when the current of circuit C is in phase with the voltage, because then the voltages on the circuits of the stationary and movable elements are in phase.

I do not desire to limit myself to the particular construction and arrangement of parts shown and described, but aim in the appended claims to cover all modifications which are within the scope of my invention.

What I claim as new and desire to secure by Letters Patent of the United States, is,

1. A power factor meter comprising relatively movable elements, each including a plurality of mechanically displaced windings, phase splitting means in circuit with the windings of each element, the circuits for each element having the same time constants as those for the other element, and indicating means actuated by the movable element of the meter.

2. A power factor meter comprising relatively movable elements, each including a plurality of mechanically displaced windings connected in parallel, impedances of different time constants included in series with the different windings of each element in the parallel circuits and producing phase displacements of the currents therein, the time constant of the circuit of each impedance and the winding of one element in series therewith being the same as that of an impedance and a winding of the other element, and indicating means actuated by the movable element of the meter.

3. A power factor meter comprising relatively movable elements, each including a plurality of mechanically displaced windings, impedances in circuit with the windings of each element, the impedances in circuit with the different windings of either element having different time constants and producing phase displacement of the currents in the windings of that element but each circuit for one element having the same time constant as a corresponding circuit for the other element, and indicating means actuated by the movable element of the meter.

4. A power factor meter comprising relatively movable elements, each including a plurality of mechanically displaced windings connected in parallel circuits, the parallel circuits for the different windings of either element having different time constants but each circuit for one element having the same time constant as a corresponding circuit for the other element, and indicating means actuated by the movable element of the meter.

5. A power factor meter comprising relatively movable elements, each including a plurality of mechanically displaced windings, phase splitting means in circuit with the windings of each element, the circuits for each element having the same time constants as the corresponding circuits of the other element and the amount of the impedance of the inductive circuit of each element being approximately equal to the resistance of the non-inductive circuit of the same element at the rated frequency of the instrument, and indicating means actuated by the movable element of the meter.

6. A power factor meter comprising relatively movable elements, each including a plurality of mechanically displaced windings, phase splitting means in circuit with the windings of each element, the circuits for each element having the same time constants as the corresponding circuits of the other element and the amounts of the impedances of two circuits of one element having the same ratio to each other as those of the other element, and indicating means actuated by the movable element of the meter.

In witness whereof, I have hereunto set my hand this 6th day of October, 1911.

JAMES R. CRAIGHEAD.

Witnesses:
 BENJAMIN B. HULL,
 HELEN ORFORD.

It is hereby certified that in Letters Patent No. 1,064,131, granted June 10, 1913 upon the application of James R. Craighead, of Schenectady, New York, for an improvement in "Power-Factor Indicators," an error appears in the printed specification requiring correction as follows: Page 1, line 18, for the word "employed" read *employing;* and that the said Letters Patent should be read with this correction therein that the same may conform to the record of the case in the Patent Office.

Signed and sealed this 8th day of July, A. D., 1913.

[SEAL.] C. C. BILLINGS,
*Acting Commissioner of Patents.*